(12) United States Patent
Krall

(10) Patent No.: US 9,157,557 B2
(45) Date of Patent: Oct. 13, 2015

(54) GAS DISTRIBUTION ASSEMBLY

(71) Applicant: Xylem Water Solutions U.S.A., Inc., Charlotte, NC (US)

(72) Inventor: Joseph G. Krall, Grafton, WI (US)

(73) Assignee: XYLEM WATER SOLUTIONS U.S.A., INC., Charlotte, NC (US)

( * ) Notice: Subject to any disclaimer, the term of this patent is extended or adjusted under 35 U.S.C. 154(b) by 289 days.

(21) Appl. No.: 13/665,262

(22) Filed: Oct. 31, 2012

(65) Prior Publication Data

US 2014/0116561 A1 May 1, 2014

(51) Int. Cl.
| | |
|---|---|
| F16L 9/18 | (2006.01) |
| C02F 3/20 | (2006.01) |
| C02F 7/00 | (2006.01) |
| B01F 3/04 | (2006.01) |
| F16L 39/00 | (2006.01) |
| F16L 39/04 | (2006.01) |

(52) U.S. Cl.
CPC ............... *F16L 9/18* (2013.01); *B01F 3/04269* (2013.01); *C02F 3/201* (2013.01); *C02F 7/00* (2013.01); *F16L 39/005* (2013.01); *F16L 39/04* (2013.01); *B01F 2003/0417* (2013.01); *B01F 2003/04148* (2013.01); *B01F 2003/04297* (2013.01); *B01F 2003/04312* (2013.01); *B01F 2003/04319* (2013.01); *C02F 2203/006* (2013.01); *Y02W 10/15* (2015.05)

(58) Field of Classification Search
CPC ................... B01F 3/04269; B01F 2003/04319
USPC ...................................... 261/121.1
See application file for complete search history.

(56) References Cited

U.S. PATENT DOCUMENTS

| | | | |
|---|---|---|---|
| 5,547,231 A | 8/1996 | Sharp | |
| 5,714,062 A | 2/1998 | Winkler et al. | |
| 2005/0151281 A1* | 7/2005 | Tharp | 261/122.1 |
| 2009/0256352 A1 | 10/2009 | Petit et al. | |

FOREIGN PATENT DOCUMENTS

| | | |
|---|---|---|
| DE | 3514028 A1 | 10/1986 |
| DE | 3624580 A1 | 2/1988 |
| DE | 4331194 C1 | 10/1994 |
| DE | 29607577 U1 | 7/1996 |
| DE | 20303221 U1 | 4/2003 |
| EP | 1128121 A1 | 8/2001 |

OTHER PUBLICATIONS

English Language Machine Translation of Menzel (DE 3624580). Nov. 3, 2014.*

* cited by examiner

*Primary Examiner* — Duane Smith
*Assistant Examiner* — Adam W Bergfelder
(74) *Attorney, Agent, or Firm* — Browdy and Neimark, PLLC

(57) ABSTRACT

A gas distribution assembly includes an outer pipe and an inner pipe, defining a gas supply chamber therebetween. Furthermore, the gas distribution assembly includes a unit for supplying compressed gas to the gas supply chamber, a first end connection connecting first ends of the outer pipe and of the inner pipe, and leaving an orifice of the first end of the inner pipe open outwards, a second end connection connecting second ends of the outer pipe and of the inner pipe, and leaving an orifice of the second end of the inner pipe open outwards. The inner pipe includes a first pipe member including the first end of the inner pipe and a second pipe member including the second end of the inner pipe, which pipe members are in telescopic engagement with each other.

10 Claims, 8 Drawing Sheets

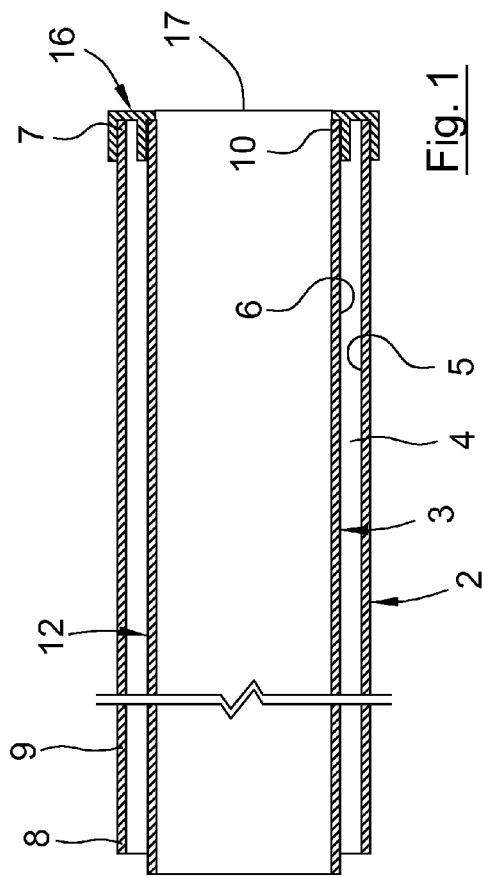
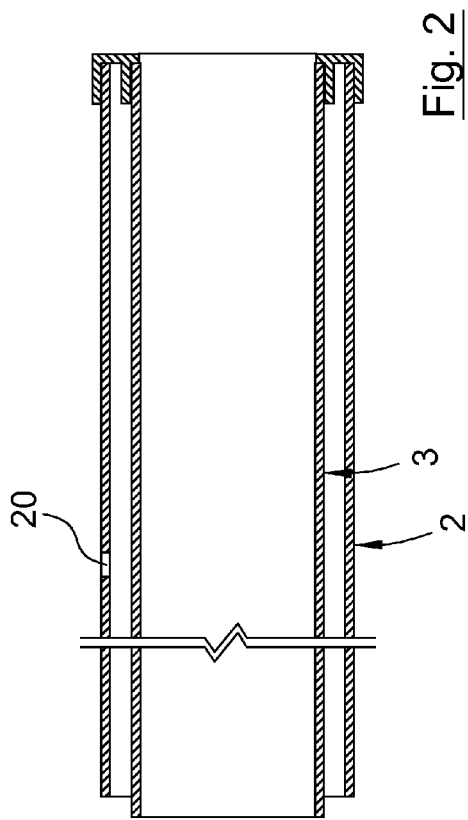
Fig. 1
Fig. 2

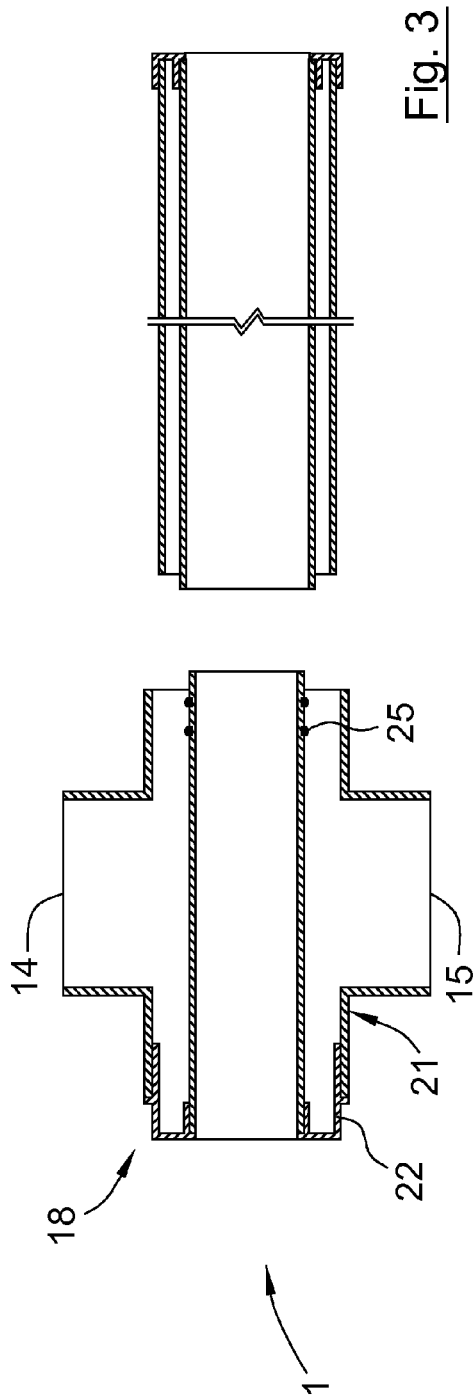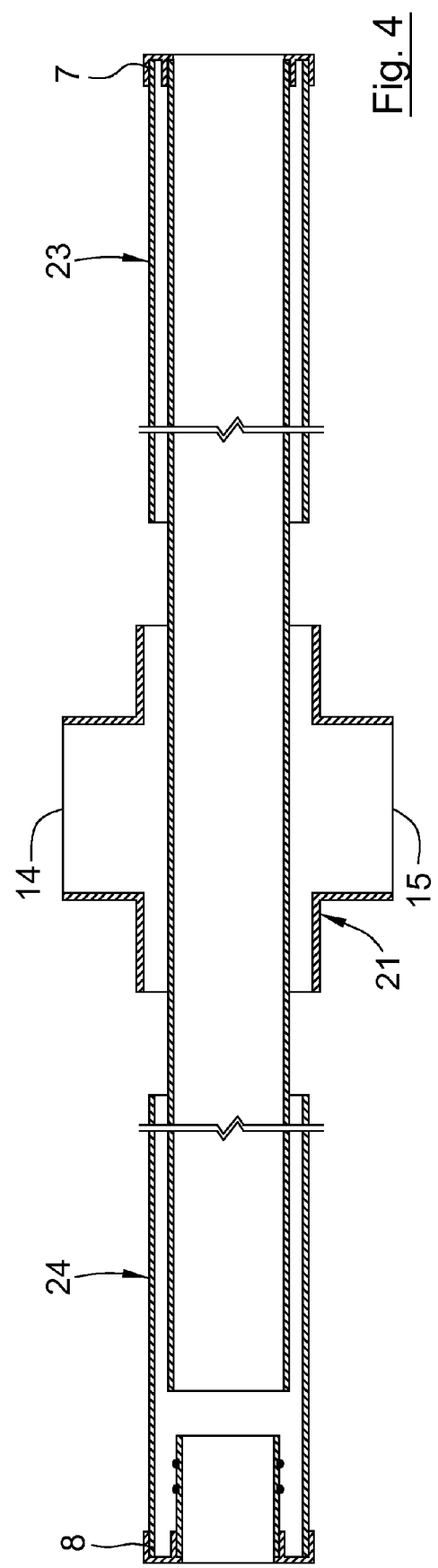

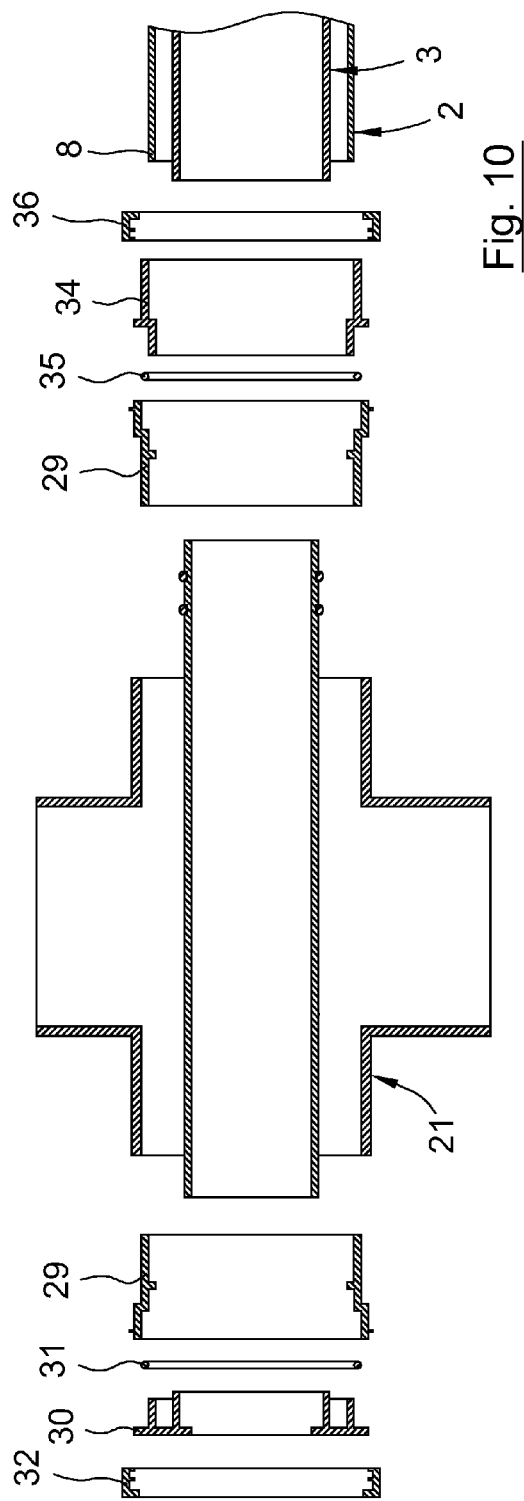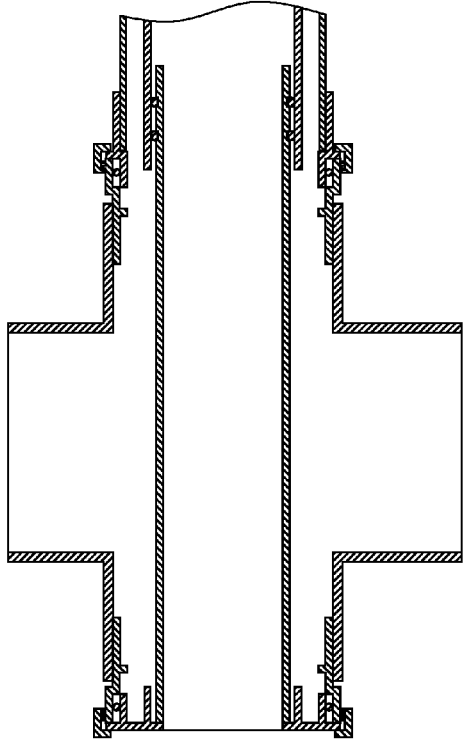

GAS DISTRIBUTION ASSEMBLY

TECHNICAL FIELD OF THE INVENTION

The present invention relates generally to the field of devices for submerged gas distribution systems, which devices are suitable for use in treatment of domestic and industrial waste water. The present invention relates specifically to the field of gas distribution assemblies having low buoyancy, which gas distribution assemblies are suitable for use in a waste water treatment plant in order to distribute compressed gas/air into the liquid to be treated. The gas distribution assembly comprises an outer pipe having a first end and a second end, an inner pipe at least partly located inside said outer pipe and having a first end and a second end, a gas supply chamber being defined by said outer pipe and said inner pipe, means for supplying compressed gas to said gas supply chamber, a first end connection connecting the first end of the outer pipe and the first end of the inner pipe, and leaving an orifice of the first end of the inner pipe open outwards, a second end connection connecting the second end of the outer pipe and the second end of the inner pipe, and leaving an orifice of the second end of the inner pipe open outwards.

Thus, an inventive gas distribution assembly presents an open ended internal space which can be filled by the liquid into which said gas distribution assembly is lowered in order to lower the buoyancy of the gas distribution assembly, without using numerous additional weights.

BACKGROUND OF THE INVENTION

In a waste water treatment process, one important process step is to oxygenate the waste water in order to promote biological consumption and removal of dissolved and suspended waste material. Aeration/oxygenation is performed in a natural waste water impound, such as lakes, ponds, or the like, or in a man-made waste water impound, such as tanks, basins, racetracks, lagoons, or the like, by using submerged gas distribution systems comprising a large number of diffuser members, also called aeration devices. In most cases the waste water impound is made of metal of concrete. Such gas distribution systems are also known as gas distribution grids. Compressed gas, such as air or other treatment gas containing some form of oxygen, is supplied to the submerged gas distribution system and then the compressed gas is diffused/discharged into the liquid by means of said numerous diffuser members as small bubbles. As these bubbles rise buoyantly through the liquid, oxygen in the bubbles dissolves into the waste water. Bacteria are supplied to the waste water in the treatment process in order to consume the waste in the liquid, and the life processes of bacteria is supported by the oxygen. Other treatment gases, not necessarily containing oxygen, may be distributed through the gas distribution system for other purposes, such as for cleaning the small discharge openings of the diffusers.

In many applications the gas distribution system is liftable, i.e. removable from the basin, in order to facilitate the service and cleaning of the gas distribution system and the basin, respectively. In order to make the anchorage as well as the removal of the gas distribution system easier, prior art gas distribution systems according to the introduction above have been developed, i.e. gas distribution systems as the one disclosed in DE 36 24 580 and DE 35 14 028. Older gas distribution systems needed a lot of additional weights to outweigh the large buoyancy of the gas distribution system, however the extra weights also made the gas distribution system more cumbersome to remove from the basin. Gas distribution systems according to DE 36 24 580 and DE 35 14 028 comprise an internal space delimited by an open ended inner pipe, which internal space is filled with liquid during lowering in order to reduce the buoyancy, during hoisting the liquid is automatically emptied from the internal space when the gas distribution system is hoisted above the liquid surface.

However, known low buoyancy gas distribution assemblies according to the introduction, and shown in DE 36 24 580 and DE 35 14 028, are only made for tube diffusers of limited length. Thereto, it is time consuming to arrive at the exact corresponding length of the inner pipe and the outer pipe, which is crucial in order to obtain a faultless and leakage free tube diffuser of the known type.

OBJECT OF THE INVENTION

The present invention aims at obviating the aforementioned disadvantages and failings of previously known gas distribution assemblies, and at providing an improved gas distribution assembly. A primary object of the present invention is to provide an improved gas distribution assembly of the initially defined type which is easier to prepare and assemble.

It is another object of the present invention to provide a gas distribution system, which can be used in connection with coarse bubble as well as fine bubble diffuser members. It is yet another object of the present invention to provide a gas distribution assembly, which can be used in connection with different types of fine bubble diffuser members, such as discs, tubes and panels.

SUMMARY OF THE INVENTION

According to the invention at least the primary object is attained by means of the initially defined gas distribution assembly having the features defined in the independent claims. Preferred embodiments of the present invention are further defined in the dependent claims.

According to the present invention, there is provided a gas distribution assembly of the initially defined type, wherein the inner pipe comprises a first pipe member including said first end of the inner pipe and a second pipe member including said second end of the inner pipe, the first pipe member and the second pipe member being in telescopic engagement with each other. A telescopic engagement between the first pipe member and the second pipe member of the inner pipe render it possible to use larger tolerances in length of the outer pipe and the inner pipe without jeopardizing the operation of the gas distribution assembly.

In a preferred embodiment of the present invention, the outer pipe comprises at least one gas discharge opening located between said first end and said second end, said at least one gas discharge opening being in fluid communication with said gas supply chamber.

According to another preferred embodiment, the second end connection comprises a branch conduit and an end cap, the branch conduit comprising said means for supplying compressed gas to said gas supply chamber. By using a branch conduit several gas distribution assemblies may be connected to each other.

According to yet another preferred embodiment, the outer pipe comprises a first pipe member including said first end of the outer pipe and a second pipe member including said second end of the outer pipe, and wherein a branch conduit is arranged between and connecting said first pipe member and said second pipe member of the outer pipe, the branch conduit comprising said means for supplying compressed gas to said gas supply chamber.

According to another preferred embodiment, the first pipe member and the second pipe member of the inner pipe are concentric, the second pipe member of the inner pipe is inserted into the first pipe member of the inner pipe, two O-rings being arranged between an outer surface of the second pipe member and an inner surface of the first pipe member of the inner pipe.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein:

FIG. 1 is a schematic partly exploded cross sectional side view of an inventive gas distribution assembly according to a first embodiment, FIG. 2 is a schematic partly exploded cross sectional side view of an inventive gas distribution assembly according to a second embodiment, FIG. 3 is a schematic partly exploded cross sectional side view of an inventive gas distribution assembly according to a third embodiment, FIG. 4 is a schematic partly exploded cross sectional side view of an inventive gas distribution assembly according to a fourth embodiment, FIG. 10 is a schematic exploded cross sectional side view of a second end of a sixth embodiment of a gas distribution assembly, FIG. 11 is a schematic assembled cross sectional side view of the second end of the sixth embodiment according to FIG. 10.

DETAILED DESCRIPTION OF PREFERRED EMBODIMENTS OF THE INVENTION

Figure 5:
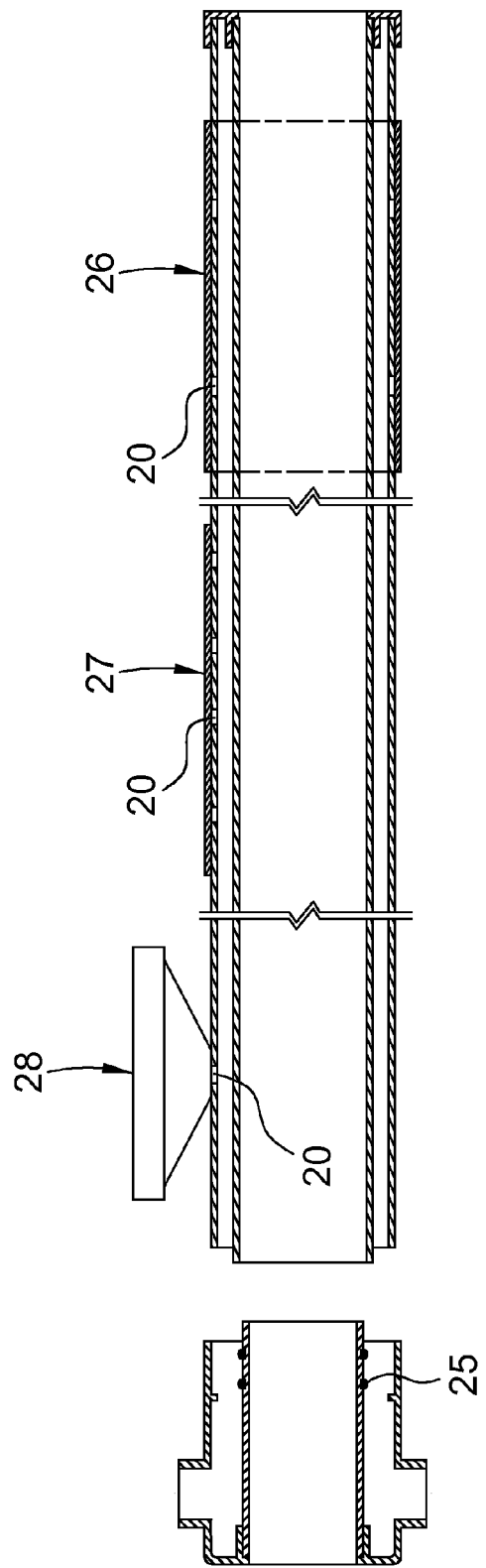
FIG. 5 is a schematic partly exploded cross sectional side view of the gas distribution assembly according to the first embodiment comprising different diffuser members.

The present invention relates to a gas distribution assembly, generally designated 1, which is suitable for use submerged in a basin in a waste water treatment plant in order to distribute a compressed gas/air into the liquid/waste water. The inventive gas distribution assembly 1 is of low buoyancy type.

The present invention is initially described with reference to FIGS. 1 and 2, disclosing a first and a second embodiment of the present invention.

The gas distribution assembly 1 comprises an outer pipe, generally designated 2, and an inner pipe, generally designated 3, which are preferably made of plastic, such as PVC.

Said inner pipe 3 is at least partly located inside said outer pipe 2, a gas supply chamber 4 being defined by the outer pipe 2 and the inner pipe 3. More exactly, said gas supply chamber 4 is preferably shaped as a toroid outwardly delimited by an inner surface 5 of the outer pipe 2 and inwardly delimited by an outer surface 6 of the inner pipe 3. The outer pipe 2 and the inner pipe 3, respectively, has preferably a circular cross section, however, it shall be pointed out that the cross section of the pipes may by squared, or any other suitable shape. The outer pipe 2 and the inner pipe 3 are preferably made of plastic. Thereto, the outer pipe 2 and the inner pipe 3 are preferably concentric in relation to each other.

The outer pipe 2 has a first end 7 and a second end 8, and in the disclosed embodiments a wall 9 extending between and connecting said first end 7 and said second end 8. The inner pipe 3 has a first end 10 and a second end 11. Thereto, the inner pipe 3 comprises a first pipe member 12 including said first end 10 of the inner pipe 3 and a second pipe member 13 including said second end 11 of the inner pipe 3, the first pipe member 12 and the second pipe member 13 being in telescopic engagement with each other. The term telescopic engagement as used herein, imply that the distance between the first end 10 and the second end 11 of the inner pipe 3 is adjustable in order to fit outer pipes 2 of different length without jeopardizing a faultless and leakage free assembly.

A typical outer diameter of the outer pipe 2 is about 100-110 mm, and a typical outer diameter of the first pipe segment 10 of the inner pipe 3 is about 70-80 mm, and a typical outer diameter of the second pipe segment 11 of the inner pipe 3 is about 60-70 mm.

The gas distribution assembly 1 also comprises means 14 for supplying compressed gas to said gas supply chamber 4. The means 14 for supplying compressed gas is connectable to a source of compressed gas, such as a blower or compressor (not shown). Said means 14 is in the shown embodiments an inlet connection arranged to receive a hose, pipe, or the like, extending from a compressed gas source, such as another gas distribution assembly. In the first embodiment according to FIG. 1, the gas distribution assembly 1 also comprises means 15 for supplying compressed gas from said gas supply chamber 4. Said means 15 is in the shown embodiment an outlet connection arranged to receive a hose, pipe, or the like, extending to another gas distribution assembly, or the like. When said means 15 is not in use it must be plugged.

Furthermore, the inventive gas distribution assembly 1 comprises a first end connection, generally designated 16, connecting the first end 7 of the outer pipe 2 and the first end 10 of the inner pipe 3, and leaving an orifice 17 of the first end 10 of the inner pipe 3 open outwards. Furthermore, the inventive gas distribution assembly 1 comprises a second end connection 18 connecting the second end 8 of the outer pipe 2 and the second end 11 of the inner pipe 3, and leaving an orifice 19 of the second end 11 of the inner pipe 3 open outwards. The first end connection 16 and the second end connection 18, respectively, may be in threaded, or press fit, engagement with the outer pipe 2 and the inner pipe 3, respectively. The first end connection 16 and the second end connection 18, respectively, are preferably made of the same material as the outer pipe 2 and the inner pipe 3.

In the second embodiment according to FIG. 2, the second end connection 18 and the second pipe member 13 of the inner pipe 3 are integral. Thereto, the means 14 for supplying compressed gas to said gas supply chamber 4, and the means 15 for supplying compressed gas from said gas supply chamber 4, are in the shown embodiments connected to the second end connection 18. In an assembled state the inventive gas distribution assembly 1 provides an open ended inner pipe 3 surrounded by a gas supply chamber 4.

According to a preferred embodiment, see for instance FIG. 2, the outer pipe 2 comprises at least one gas discharge opening 20 located between said first end 7 and said second end 8, said at least one gas discharge opening 20 being in fluid communication with said gas supply chamber 4, i.e. connecting the gas supply chamber 4 with the outside of the outer pipe 2. Said gas discharge opening 20 is arranged to discharge the compressed gas from the gas supply chamber 4.

In one embodiment (not disclosed) the outer pipe 2 constitutes a coarse bubble diffuser member, having a plurality of gas discharge openings 20 which mouth in the envelop surface of the outer pipe 2 and from which gas bubbles are discharged directly into the liquid in which the gas distribution assembly 1 is submerged. In this embodiment the outer pipe 2 preferably is made of stainless steel, or any other non-corrosive metal.

Reference is now made to FIG. 3, disclosing a third embodiment of the inventive gas distribution assembly 1.

In the shown embodiment the second end connection 18 comprises a branch conduit 21, or part of a manifold, and an end cap 22, the branch conduit 21 comprising said means 14 for supplying compressed gas to said gas supply chamber 4. The end cap 22 connects the second end 11 of the inner pipe 3 with the branch conduit 21, and the branch conduit 21 is connected to the second end 8 of the outer pipe 2. In the shown embodiment the branch conduit 21 comprises the means 14 for supplying gas to the gas supply chamber 4 and the means 15 for supplying gas from the gas supply chamber 4, however, it shall be pointed out that the means 15 for supplying gas from the gas supply chamber 4 is an optional feature of the branch conduit 21. Preferably several gas distribution assemblies 1 are connected to each other providing a gas distribution system, or grid.

Reference is now made to FIG. 4, disclosing a forth embodiment of the inventive gas distribution assembly 1.

In the shown embodiment the outer pipe 2 comprises a first pipe member 23 including said first end 7 of the outer pipe 2 and a second pipe member 24 including said second end 8 of the outer pipe 2, and wherein a branch conduit 21 is arranged between and connecting said first pipe member 23 and said second pipe member 24 of the outer pipe 2. In the shown embodiment the branch conduit 21 comprises the means 14 for supplying gas to the gas supply chamber 4 and the means 15 for supplying gas from the gas supply chamber 4, however, it shall be pointed out that the means 15 for supplying gas from the gas supply chamber 4 is an optional feature of the branch conduit 21.

In an alternative (not disclosed) embodiment the first pipe member 23 and the second pipe member 24 of the outer pipe 2 are connected directly to each other, in order to obtain an outer pipe 2 having a greater axial extent. It shall also be pointed out that the outer pipe may comprise more than two operatively connected pipe segments.

In all embodiments it is preferred that the first pipe member 12 and the second pipe member 13 of the inner pipe 3 are concentric with each other, the second pipe member 13 of the inner pipe 3 being inserted into the first pipe member 12 of the inner pipe 3. Thereto, two O-rings 25 are arranged between an outer surface of the second pipe member 13 and an inner surface of the first pipe member 12 of the inner pipe 3. It shall be pointed our that any other suitable sealing may be used, instead of said two O-rings.

Reference is now made to FIG. 5. In FIG. 5 the gas distribution assembly comprises at least one diffuser member connected to the outer pipe 2. In general different types of diffuser members are not present in one single gas distribution system, and the configuration of FIG. 5 is only of illustrative purpose. The at least one diffuser member at least partly defines a gas discharge chamber that is in fluid communication with the gas supply chamber 4 via said at least one gas discharge opening 20. In FIG. 5 different types of fine bubble diffuser members are shown. To the right in FIG. 5 is disclosed a tube membrane 26 that is arranged about and connected to the outer pipe 2, in the middle in FIG. 5 is disclosed a panel diffuser 27 connected to the outer pipe 2, and to the left in FIG. 5 is disclosed a disc diffuser 28 connected to the outer pipe 2.

It shall be pointed out that regarding the panel diffuser 27 the outer pipe 2 may be part of the diffuser member and coproduced together with a membrane support wing of the panel diffuser, alternatively the membrane support wing of the panel diffuser may be connected to the outer pipe 2. It shall be pointed out that the entire length of the outer pipe 2 need not be equipped with diffuser members, i.e. due to the low buoyancy of the inventive gas distribution assembly and to the fact that the length of the outer pipe 2 and of the inner pipe 3 is not restricted by the diffuser members, it is an advantage to leave at least one length of the outer pipe 2 unequipped. Which unequipped lengths can be provided with plugged diffuser holders, plugged gas discharge openings 20, or be intact, in order to later on be equipped with diffuser members.

By means of the inventive gas distribution assembly, improved gas distribution can be provided, i.e. by sizing the gas discharge openings 20 in the outer pipe 2 based on the specific diffuser member type, air flow rate and gas distribution system size.

Reference is now made to FIGS. 6-11, disclosing preferred embodiments of the first end connection 16 and the second end connection 18 of the inventive gas distribution assembly 1.

Figure 6:
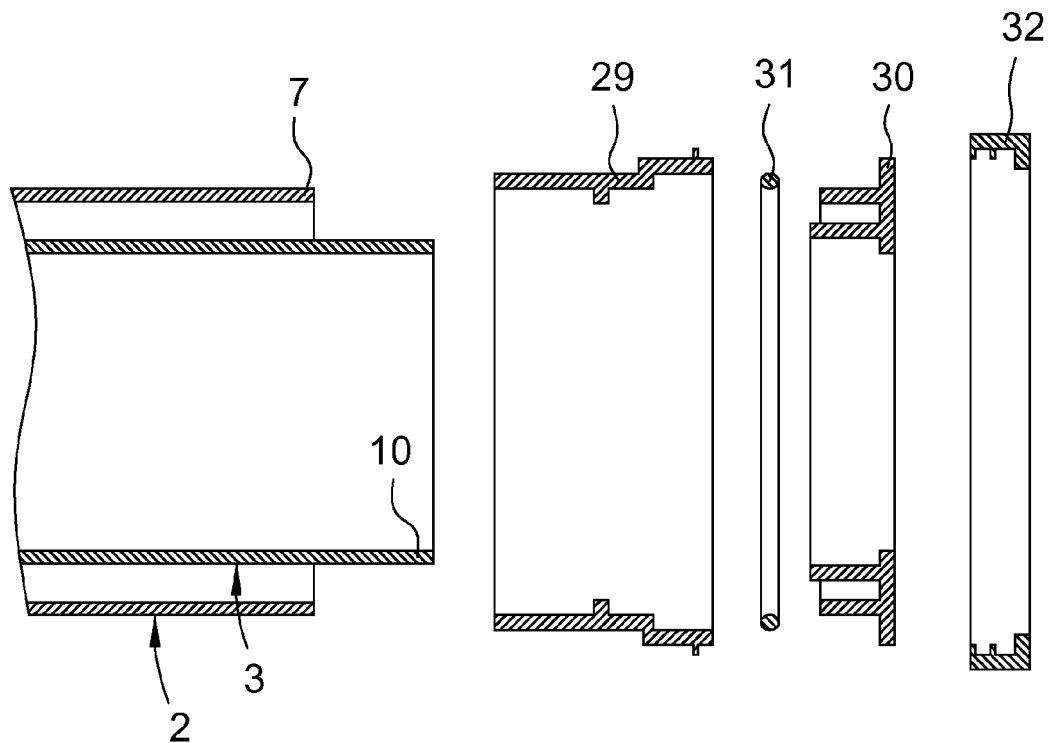
FIG. 6 is a schematic exploded cross sectional side view of a first end of a fifth embodiment of a gas distribution assembly.
Figure 7:
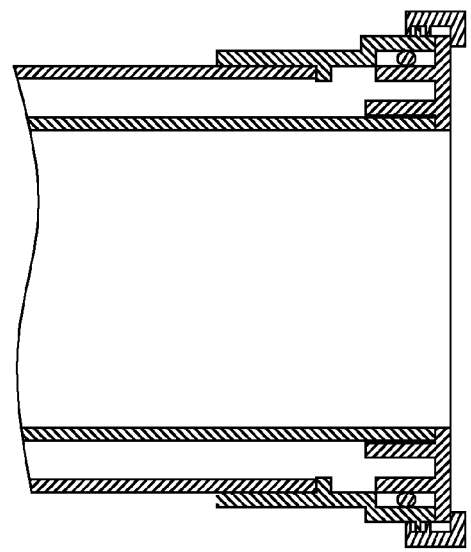
FIG. 7 is a schematic assembled cross sectional side view of the first end of the fifth embodiment according to FIG. 6.

The first end connection 16 of a fifth embodiment of the gas distribution assembly disclosed in FIGS. 6 and 7 comprises a socket end 29 connected by means of press fit to the first end 7 of the outer pipe 2, an end cap 30 connected by means of press fit to the first end 10 of the inner pipe 3 and inserted into said socket end 29 in an axial direction, a sealing 31 (O-ring) arranged between an inner surface of said socket end 29 and an outer surface of said end cap 30, and a retaining ring 32 which is in threaded engagement with the socket end 29 and clamps the end cap 30 against the socket end 29 in an axial direction.

Figure 8:
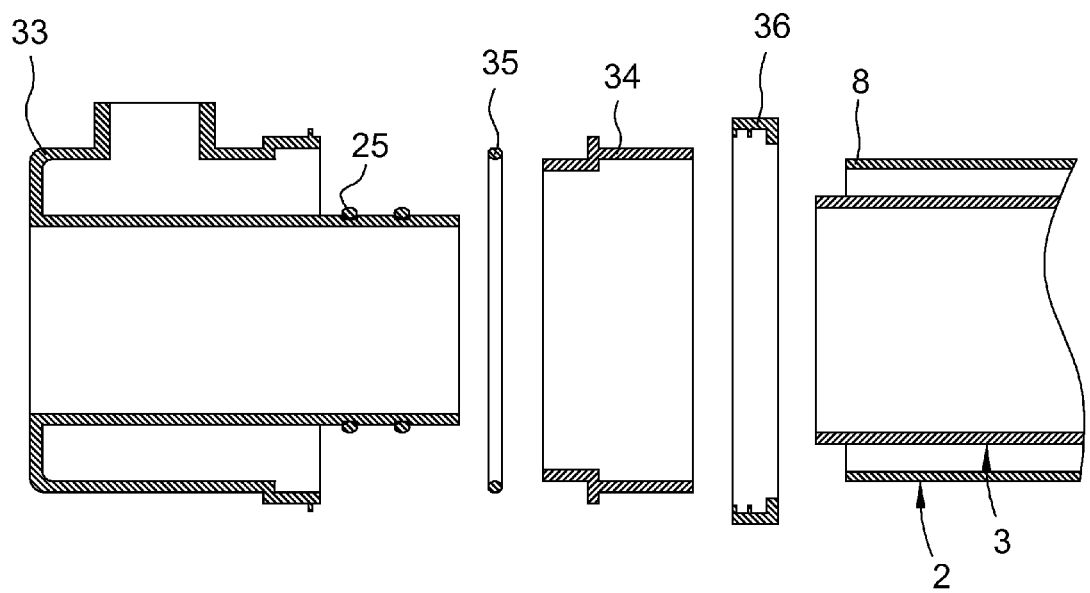
FIG. 8 is a schematic exploded cross sectional side view of a second end of the fifth embodiment according to FIG. 6.
Figure 9:
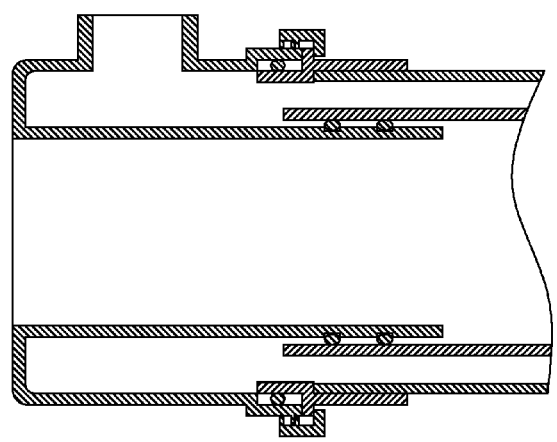
FIG. 9 is a schematic assembled cross sectional side view of the second end of the fifth embodiment according to FIG. 6.

The second end connection 18 of the fifth embodiment of the gas distribution assembly disclosed in FIGS. 8 and 9 comprises an end cap 33 connected to the second end 11 of the inner pipe 3, a spigot end 34 connected by means of press fit to the second end 8 of the outer pipe 2 and inserted into said end cap 33 in an axial direction, a sealing 35 (O-ring) arranged between an inner surface of said end cap 33 and an outer surface of said spigot end 34, and a retaining ring 36 which is in threaded engagement with the end cap 33 and clamps the spigot end 34 against the end cap 33 in an axial direction.

The second end connection 18 of a sixth embodiment of the gas distribution assembly disclosed in FIGS. 10 and 11 comprises a socket end 29 connected by means of press fit to the branch conduit 21, an end cap 30 connected by means of press fit to the second end 11 of the inner pipe 3 and inserted into said socket end 29 in an axial direction, a sealing 31 (O-ring) arranged between an inner surface of said socket end 29 and an outer surface of said end cap 30, and a retaining ring 32 which is in threaded engagement with the socket end 29 and clamps the end cap 30 against the socket end 29 in an axial direction. Further the second end connection 18 of a sixth embodiment of the gas distribution assembly disclosed in FIGS. 10 and 11 comprises a branch conduit 21, a socket end 29 connected by means of press fit to the branch conduit 21, a spigot end 34 connected by means of press fit to the second end 8 of the outer pipe 2 and inserted into said socket end 29 in an axial direction, a sealing 35 (O-ring) arranged between an inner surface of said socket end 29 and an outer surface of said spigot end 34, and a retaining ring 36 which is in threaded engagement with the socket end 29 and clamps the spigot end 34 against the socket end 29 in an axial direction.

Figure 12:
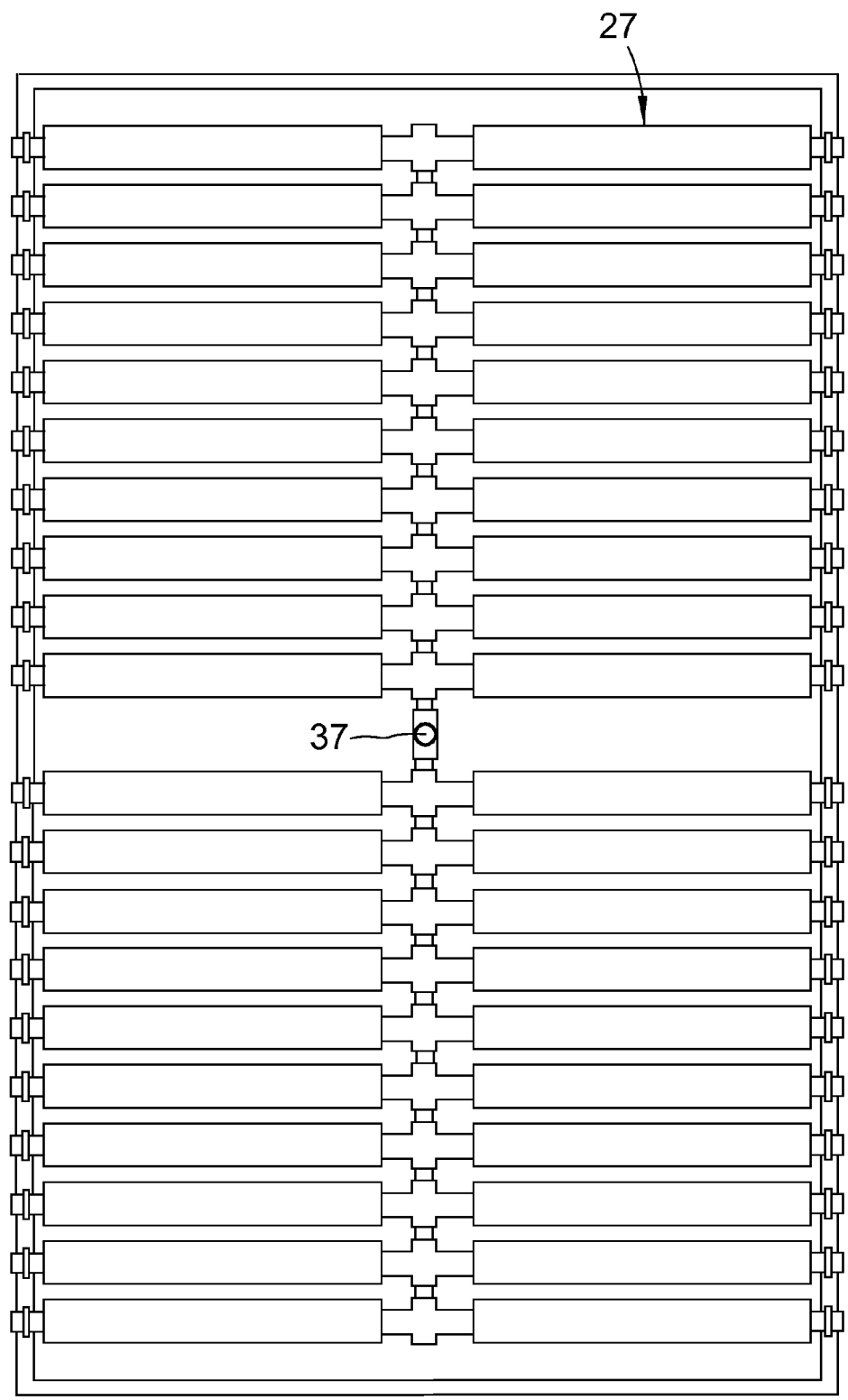
FIG. 12 is a schematic view from above of a grid comprising panel diffuser members.
Figure 13:
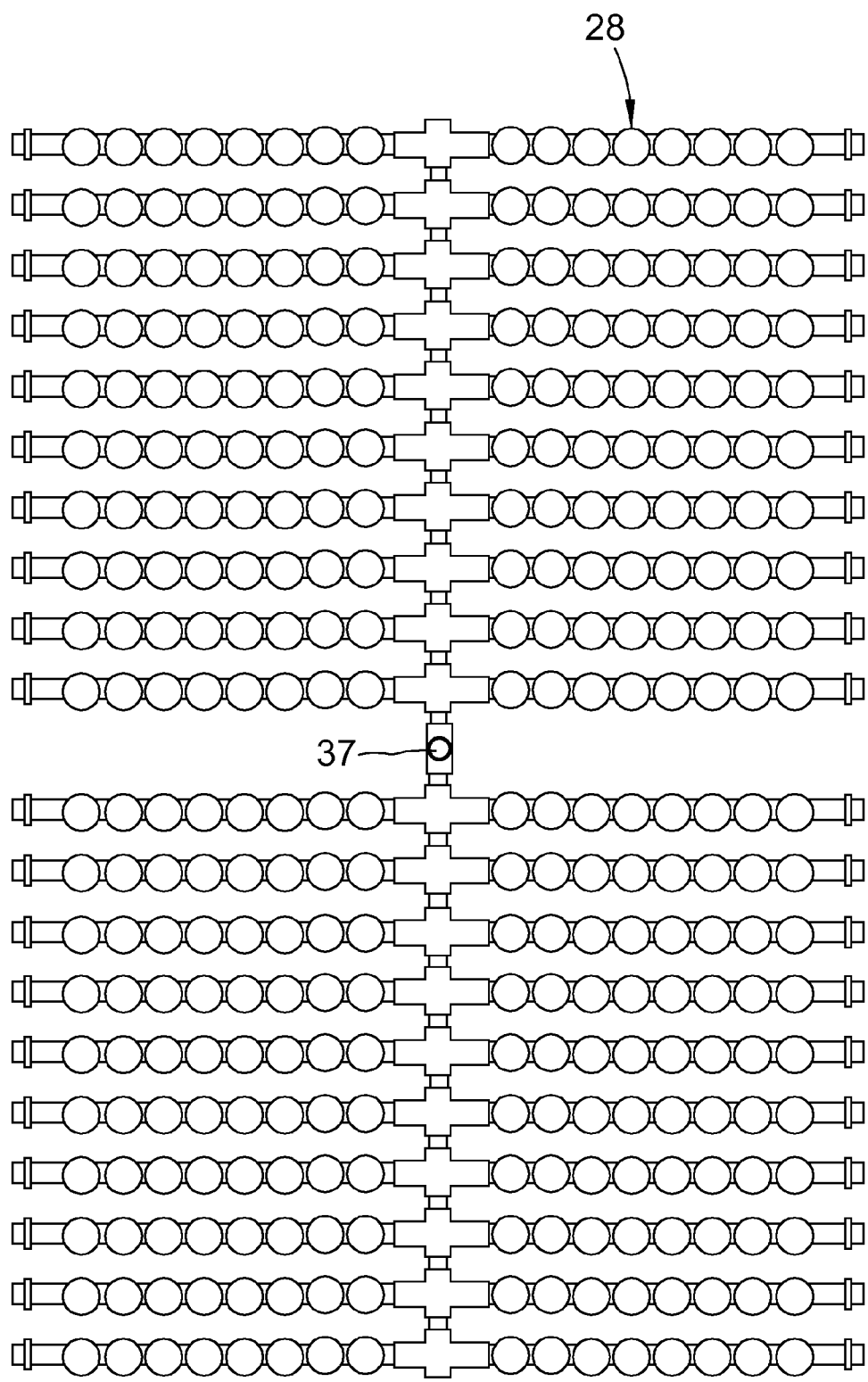
FIG. 13 is a schematic view from above of a grid comprising disc diffuser members.

Reference is now made to FIG. 12, which discloses a gas distribution system comprising a plurality of inventive gas distribution assemblies 1 according to FIG. 4 provided with panel diffuser members 27. A central gas supply connection 37 is arranged to supply compressed gas to the gas distribution system. Reference is now made to FIG. 13, in which the panel diffuser members 27 of FIG. 12 are exchanged by disc diffuser members 28. Such gas distribution systems may be self supporting or be connected to a frame, or the like.

It shall be pointed out that the present invention is also intended to be used in order to upgrade present gas distribution assemblies constituted by an outer pipe having closed ends. Thus, the inner pipe and the end connections are essential features that constitute the most central parts of the invention.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall be pointed out that although the terms "threaded engagement" and "press fit", respectively, for sake of simplicity have been used in the description, it shall be realized that also other types of bonding are included, such as solvent welding, spin welding, sonic welding, adhesive, etc. as well as mechanical engagement methods such as snap-in connection, etc.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A gas distribution assembly for distributing a compressed gas, said gas distribution assembly comprising:
   an outer pipe having a first end and a second end,
   an inner pipe at least partly located inside said outer pipe and having a first end and a second end, a gas supply chamber being defined by said outer pipe and said inner pipe,
   means for supplying compressed gas to said gas supply chamber,
   a first end connection connecting the first end of the outer pipe and the first end of the inner pipe, and leaving an orifice of the first end of the inner pipe open outwards,
   a second end connection connecting the second end of the outer pipe and the second end of the inner pipe, and leaving an orifice of the second end of the inner pipe open outwards,
   wherein the inner pipe comprises a first pipe member including said first end of the inner pipe and a second pipe member including said second end of the inner pipe, the first pipe member and the second pipe member being in telescopic engagement with each other.

2. The gas distribution assembly according to claim 1, wherein the outer pipe comprises at least one gas discharge opening located between said first end and said second end, said at least one gas discharge opening being in fluid communication with said gas supply chamber.

3. The gas distribution assembly according to claim 1, wherein the second end connection comprises a branch conduit and an end cap, the branch conduit comprising said means for supplying compressed gas to said gas supply chamber.

4. The gas distribution assembly according to claim 1, wherein the outer pipe comprises a first pipe member including said first end of the outer pipe and a second pipe member including said second end of the outer pipe, and wherein a branch conduit is arranged between and connecting said first pipe member and said second pipe member of the outer pipe, the branch conduit comprising said means for supplying compressed gas to said gas supply chamber.

5. The gas distribution assembly according to claim 1, wherein the second end connection and the second pipe member of the inner pipe are integral.

6. The gas distribution assembly according to claim 1, wherein the first pipe member and the second pipe member of the inner pipe are concentric, the second pipe member of the inner pipe is inserted into the first pipe member of the inner pipe, two O-rings being arranged between an outer surface of the second pipe member and an inner surface of the first pipe member of the inner pipe.

7. The gas distribution assembly according to claim 2, wherein at least one diffuser member is connected to the outer pipe and at least partly defines a gas discharge chamber that is in fluid communication with the gas supply chamber via said at least one gas discharge opening.

8. The gas distribution assembly according to claim 7, wherein said at least one diffuser member is constituted by a tube membrane that is arranged about and connected to the outer pipe.

9. The gas distribution assembly according to claim 7, wherein said at least one diffuser member is constituted by a disc diffuser connected to the outer pipe.

10. The gas distribution assembly according to claim 7, wherein said at least one diffuser member is constituted by a panel diffuser connected to the outer pipe.

* * * * *